(12) United States Patent
Watanabe

(10) Patent No.: US 6,437,635 B1
(45) Date of Patent: Aug. 20, 2002

(54) AMPLIFICATION TYPE SOLID STATES IMAGING DEVICE OUTPUT CIRCUIT CAPABLE OF STABLY OPERATING AT A LOW VOLTAGE

(75) Inventor: Takashi Watanabe, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/532,256

(22) Filed: Mar. 22, 2000

(30) Foreign Application Priority Data

Mar. 26, 1999 (JP) ............................................ 11-083747

(51) Int. Cl.$^7$ ............................................... H01L 31/00
(52) U.S. Cl. ........................................ 327/514; 327/515
(58) Field of Search ................................. 327/514, 515, 327/101, 103, 427, 541, 543; 330/257, 288; 323/312, 313, 315

(56) References Cited

U.S. PATENT DOCUMENTS

| 4,454,416 A | * | 6/1984 | Gontowski, Jr. et al. ... 330/288 |
| 4,891,606 A | * | 1/1990 | Clark, II et al. ............ 327/514 |
| 5,276,359 A | * | 1/1994 | Chiang ........................ 327/514 |
| 5,391,997 A | * | 2/1995 | Meyer et al. ................ 327/514 |
| 5,818,294 A | * | 10/1998 | Ashmore, Jr. ................ 327/543 |
| 5,966,035 A | * | 10/1999 | Lien ............................. 327/89 |
| 6,094,098 A | * | 6/2000 | Vallancourt ................. 330/257 |
| 6,147,556 A | * | 11/2000 | Nakado ....................... 330/277 |

FOREIGN PATENT DOCUMENTS

JP          60-58706          4/1985

OTHER PUBLICATIONS

"A 1/4 Inch 330k Pixel VGA CMOS Image Sensor", K. Mabuchi, et al. ITE Technical Report, vol. 21, No. 21 pp. 25–30; IPU 97–13. CE 97–5 (mar. 1997).

* cited by examiner

Primary Examiner—Matthew Smith
Assistant Examiner—Paul Dinh
(74) Attorney, Agent, or Firm—Edwards & Angell, LLP; David G. Conlin; William J. Daley, Jr.

(57) ABSTRACT

An amplification type solid state imaging device output circuit includes a source follower circuit and a current mirror circuit. The source follower circuit is formed of a first MOS transistor Q11 and a second MOS transistor Q15 that is used as a load and is connected to the first MOS transistor Q11 via a vertical signal line. The current mirror circuit is formed of the second MOS transistor Q15 and a third MOS transistor Q21 which has the same channel structure and in which the gate and the drain are connected to the gate of the second MOS transistor Q15. The drain of the third MOS transistor Q21 is connected to a power source via a fixed resistor R11. The variation in the current flowing through the fixed resistor R11 and the third MOS transistor Q21 is reduced, and therefore, the variation in the current of the second MOS transistor Q15 used as a load can be reduced, allowing a wide operating margin to be secured. Thus, the amplification type solid state imaging device output circuit is capable of suppressing fluctuations in consumption of current with respect to fluctuations in a threshold voltage and a power voltage and stably operating at a low voltage, with a simple construction.

8 Claims, 8 Drawing Sheets

US 6,437,635 B1

AMPLIFICATION TYPE SOLID STATES IMAGING DEVICE OUTPUT CIRCUIT CAPABLE OF STABLY OPERATING AT A LOW VOLTAGE

BACKGROUND OF THE INVENTION

The present invention relates to an amplification type solid state imaging device output circuit provided with a source follower circuit.

There has conventionally been proposed an amplification type solid state imaging device whose pixels are each provided with an amplifying function, the device operating to read an amplified signal by means of a scanning circuit. In particular, there has been known an APS (Active Pixel Sensor) type image sensor having a CMOS type pixel construction advantageous to the integration thereof with a peripheral drive circuit and a signal processing circuit. According to this APS type image sensor, there are formed a photoelectric conversion section, an amplifying section, a pixel selecting section and a reset section within one pixel, and normally three to four MOS transistors are used in addition to the photoelectric conversion section constructed of a photodiode (PD).

FIG. 6 shows a circuit diagram of the essential part of an amplification type solid state imaging device in which each pixel is constructed of a PD and three transistors (Mabuchi et al., "A ¼ Inch 330k Pixel VGA CMOS Image Sensor", ITE Technical Report, IPU97-13, March, 1997). FIG. 6 shows a photodiode D1 that serves as a photoelectric conversion section, a MOS transistor Q11 that serves as an amplifying section, a MOS transistor Q12 that serves as a reset section, a MOS transistor Q13 that serves as a pixel selecting section, a pixel selecting clock line 11, a reset clock line 12, a vertical signal line 13 and a power line 14. Signal charges to be accumulated in the photodiode D1 are electrons, and each of the MOS transistors Q11, Q12, Q13, Q15, Q16, Q17 and Q30 is the n-channel type.

The MOS transistors Q12 and Q13 are driven by a first vertical scanning circuit 20 and a second vertical scanning circuit 21 via the pixel selecting clock line 11 and the reset clock line 12, respectively. The MOS transistor Q15 that serves as a constant current load is connected to the vertical signal line 13, and a signal on the vertical signal line 13 is conducted to a horizontal signal line 19 via the fourth MOS transistor Q16 for amplification use and the MOS transistor Q17 driven by a horizontal scanning circuit 22. The MOS transistor Q30 that serves as a constant current load is connected to the horizontal signal line 19, and a signal OS is outputted via an amplifier circuit 24. Fixed potentials $V_{L1}$ and $V_{L2}$ are applied to a gate of the MOS transistor Q15 and a gate of the MOS transistor Q30, respectively.

In FIG. 6, the pixels are all constructed of n-channel type MOS transistors and pn junction diodes, and therefore, the pixels can be formed through the normal CMOS processes. On the other hand, analog circuits such as the amplifier circuit 24 and digital circuits such as the vertical scanning circuits 20 and 21 and the horizontal scanning circuit 22 are generally constructed of CMOS circuits. Therefore, both the pixels and the peripheral circuits can be formed through common processes. This allows the power source to be commonized and practically a power voltage $V_D$ is used for the pixels and the peripheral circuits.

In order to reduce consumption of power in the amplification type solid state imaging device output circuit having the construction shown in FIG. 6, it is effective to lower the power voltage $V_D$. According to the source follower circuit constructed of the MOS transistors Q11 and Q15, a photodiode potential is applied as an input $v_i$ to a gate of the MOS transistor Q11, and an output $v_o$ is obtained on the vertical signal line 13. FIG. 7 shows a relation between the input $v_i$ and the output $v_o$ of the above amplification type solid state imaging device output circuit. Assuming that the power voltage is $V_D$, the gate voltage of the MOS transistor Q15 is $V_L$ and a threshold voltage of the MOS transistor Q15 is $V_{Tn}$, then the MOS transistor Q15 is required to operate in a saturation region (i.e., in a constant current operation region) in order that the input $v_i$ and the output $v_o$ have a linear relation, when the equation:

$$V_o > V_L - V_{Tn} \tag{1}$$

should hold.

In order to secure a sufficient operating margin when the power voltage $V_D$ is lowered, it is required to sufficiently reduce $V_L - V_{Tn}$. For example, when the characteric curve changes from A to B as shown in FIG. 7, $V_L - V_{Tn}$ increases from $V_{LA} - V_{Tn}$ to $V_{LB} - V_{Tn}$, consequently reducing the operating margin from A' to B'.

On the other hand, the MOS transistor Q11 inside the pixel has an ability gm to drive the vertical signal line 13, given by the following equation:

$$gm = \sqrt{2I_d \mu C W/L} \tag{2}$$

where $I_D$ represents a drain current, $\mu$ represents mobility, C represents gate capacitance per unit area, W/L represents channel width/length of the MOS transistor Q11. Assuming that a signal line capacity is $C_L$, then a time constant τ in the signal line driving stage is expressed by the following equation:

$$\tau = C_L / g_m \tag{3}$$

Therefore, if the drain current $I_D$ is small, then $g_m$ is reduced. As a result, the time constant τ is increased, as a consequence of which the MOS transistor Q11 becomes unable to drive the vertical signal line 13 to $v_o$ within a given time.

The value $I_D$ of the constant current due to the MOS transistor Q15 is expressed from the relation of the saturation region by the following equation:

$$I_D = (\mu C W/2L)(V_G - V_T)^2 \tag{4}$$

where $V_G$ represents a gate voltage and $V_T$ represents a threshold voltage.

With respect to $V_G - V_T = V_L - V_{Tn}$, the drain current $I_D$ is shown in FIG. 8. In this case, the value of $V_L - V_{Tn}$ varies depending on variation in the gate voltage $V_L$ and the threshold voltage $V_{Tn}$.

As described in FIG. 7, it is necessary to set $V_L - V_{Tn}$ smaller in order to widen the operating margin. However, in the case that the width of variation $\Delta V_{Tn}$ of $V_{Tn}$ and the width of variation $\Delta V_L$ of $V_L$ are constant as shown in FIG. 8, there occurs a disadvantage that a ratio $\Delta I_D / I_{D0}$ of the variation $\Delta I_D$ of $I_D$ relative to the center value $I^{D0}$ of $I_D$ increases as $V_L - V_{Tn}$ is set smaller.

As shown in FIG. 9, the gate voltage $V_L$ is generally obtained by dividing the power voltage $V_D$ by resistors R21 and R22. Therefore, the gate voltage $V_L$ varies according to variation in the power voltage $V_D$. The threshold voltage $V_{Tn}$ of the MOS transistor Q15 cannot normally avoid varying within a specified range during the MOS processes. In particular, $V_L - V_{Tn}$ is suppressed to a reduced value in connection with the equation (1), and therefore, the variation in the threshold voltage $V_{Tn}$ strongly influences, as a consequence of which the drain current $I_D$ largely varies within the range of $\Delta I_D$ shown in FIG. 8. According to this source follower circuit, it is required to satisfy the equations (2) and (3) even with the minimum drain current $I_D$ from the point of view of the signal line driving ability, and the current value becomes very great at the maximum drain current $I_D$, which is contradictory to the reduction in consumption of power.

In regard to the source follower circuit constructed of the fourth MOS transistor Q16 and the fifth MOS transistor Q30, the same argument can hold assuming that the power voltage is $V_D$, the gate voltage of the MOS transistor Q30 is $V_L$ and the threshold voltage of the MOS transistor Q30 is $V_{Tn}$.

As a method for suppressing the variation in the threshold voltage of the MOS transistor located on the load side of the source follower circuit in view of the above reasons, there is proposed the one employing a monitor circuit (the prior art reference of Japanese Patent Laid-Open Publication No. SHO 60-58706) as shown in FIG. 10. This source follower circuit is provided with a diode D100, a transistor Q100 for resetting the diode D100, transistors Q101 through Q104 constituting an output circuit and transistors Q201 through Q204 that serve as a monitor circuit for applying a DC voltage to the gate of the transistor Q103. As shown in FIG. 11, a current flowing through the MOS transistor Q201 on the power source side of the monitor circuit greatly depends on the output voltage, and therefore, the current cannot be regarded as a constant current. As shown in FIG. 11, with respect to a variation in the threshold voltage of the MOS transistor, the output voltage of the MOS transistor Q203 located on the load side has a roughly constant value $V_{BB}$ at the intersection of the characteristic curves of the MOS transistor Q201 and the MOS transistor Q203, whereas the output current greatly varies as indicated by $\Delta I_{BB}$. As is apparent from the equation (4), this means that $V_G-V_T$ of the MOS transistor located on the load side greatly varies, indicating that this amplification type solid state imaging device output circuit is not appropriate for the reduction in voltage.

SUMMARY OF THE INVENTION

Accordingly, an object of the present invention is to provide an amplification type solid state imaging device output circuit capable of securing a sufficient operating margin with respect to fluctuations in a threshold voltage and a power voltage, suppressing fluctuations in consumption of current and stably operating at a low voltage, with a simple construction.

In order to achieve the aforementioned object, the present invention provides an amplification type solid state imaging device output circuit with a first source follower circuit comprised of a first MOS transistor that is formed on a semiconductor substrate and amplifies a photoelectric conversion signal from a photoelectric conversion element and a second MOS transistor used as a load that is formed on the semiconductor substrate and is connected to the first MOS transistor via a signal line, comprising: a third MOS transistor that is formed on the semiconductor substrate with a channel structure identical to that of the second MOS transistor and has a gate and a drain connected to a gate of the second MOS transistor so as to form a current mirror circuit with the second MOS transistor; and a first load that is formed on the semiconductor substrate and provided for flowing a roughly constant current through the third MOS transistor.

According to the above invention, if a roughly constant current flows through the third MOS transistor due to the first load in the second and third MOS transistors of an identical channel structure forming the current mirror circuit, then the gate voltage of the third MOS transistor is applied to the gate of the second MOS transistor used as a load, as a consequence of which a current roughly identical to the current flowing through the third MOS transistor flows through the second MOS transistor located on the load side. Therefore, the current flowing through the second MOS transistor located on the load side varies roughly in proportion to the variation in the current flowing through the third MOS transistor. The variation in the current flowing through the third MOS transistor is reduced with respect to the variation in the threshold voltage of the third MOS transistor by flowing a roughly constant current through the third MOS transistor of the current mirror circuit by means of the first load. With this arrangement, the variation in the current flowing through the second MOS transistor is reduced with respect to the variation in the threshold voltage of the second MOS transistor located on the load side. As described above, the variation in the current flowing through the second MOS transistor located on the load side is small in the first source follower circuit that amplifies the photoelectric conversion signal from the photoelectric conversion element and outputs the resulting signal to the signal line. Therefore, even if the potential difference between the gate voltage and the threshold voltage of the second MOS transistor located on the load side is reduced in order to widen the operating margin of the first source follower circuit, the ability to drive the signal line of the first source follower circuit scarcely changes. Therefore, a sufficient operating margin can be secured with respect to the fluctuation in the threshold voltage and the power voltage, and the fluctuation in consumption of current can be suppressed with a simple construction. By reducing the voltage difference between the gate voltage and the threshold voltage of the second MOS transistor located on the load side, a sufficient operating margin can be secured even if the power voltage is lowered.

In one embodiment of the invention, the first load is a MOS transistor of an opposite conductive type to a conductive type of the third MOS transistor, and a potential difference between the source and the gate of the MOS transistor is used as a power voltage.

According to the above embodiment, the first load of the third MOS transistor, i.e., the load of the current mirror circuit is provided by the MOS transistor which has the conductive type opposite to the conductive type of the third MOS transistor and in which the potential difference between the source and the gate is used as a power voltage. With this arrangement, the power voltage is sufficiently greater than the variation in threshold voltage of the MOS transistor. Therefore, the quantity of change in the voltage difference between the gate voltage and the threshold voltage is reduced, and the quantity of change in the current flowing through the third MOS transistor of the current mirror circuit is also reduced. Therefore, the quantity of change in the current flowing through the second MOS transistor located on the load side of the first source follower circuit for driving the signal line is reduced, allowing the operating margin of the first source follower circuit to be wider.

In one embodiment of the invention, the first load is a fixed resistor.

According to the above embodiment, the first load of the third MOS transistor, i.e., the load of the current mirror circuit is provided by a fixed resistance. With this arrangement, the quantity of change in the current flowing through the third MOS transistor of the current mirror circuit depending on the variation in the resistance value of the fixed resistor is reduced. Therefore, the quantity of change in the current flowing through the second MOS transistor located on the load side of the first source follower circuit for driving the signal line is also reduced, allowing the operating margin of the first source follower circuit to be wide.

In one embodiment of the invention, a potential difference between a gate voltage and a threshold voltage of the second MOS transistor is set to 1 V or less.

According to the above embodiment, the voltage difference between the gate voltage and the threshold voltage of the second MOS transistor located on the load side is set to 1 V or less. With this arrangement, the operating margin is widened, by which a sufficient operating margin can be secured even if the power voltage is lowered, allowing a low-voltage operation to be achieved. Therefore, an amplification type solid state imaging device capable of stably operating at a low voltage can be provided.

The present invention also provides an amplification type solid state imaging device output circuit provided with a first source follower circuit comprised of a first MOS transistor that is formed on a semiconductor substrate and amplifies a photoelectric conversion signal from a photoelectric conversion element and a second MOS transistor used as a load that is formed on the semiconductor substrate and is connected to the first MOS transistor via a signal line, comprising: a fourth MOS transistor that is formed on the semiconductor substrate and amplifies a signal on the signal line; a fifth MOS transistor used as a second load that is formed on the semiconductor substrate and is connected to the fourth MOS transistor via a common signal line so as to form a second source follower circuit with the fourth MOS transistor; a sixth MOS transistor that is formed on the semiconductor substrate with a channel structure identical to that of the fifth MOS transistor and has a gate and a drain connected to a gate of the fifth MOS transistor so as to form a current mirror circuit with the fifth MOS transistor; and a second load that is formed on the semiconductor substrate and provided for flowing a roughly constant current through the fifth MOS transistor.

According to the above prevention, similarly to the first source follower circuit, the variation in the current flowing through the fifth MOS transistor located on the load side is small in the second source follower circuit that amplifies the signal on the signal line and drives the common signal line. Therefore, even if the voltage difference between the gate voltage and the threshold voltage of the fifth MOS transistor located on the load side is reduced in order to widen the operating margin of this second source follower circuit, the ability of the second source follower circuit to drive the common signal line scarcely changes. Therefore, a sufficient operating margin can be secured and the fluctuation in consumption of current can be suppressed with respect to the fluctuation in the threshold voltage and the power voltage, with a simple construction. By reducing the voltage difference between the gate voltage and the threshold voltage of the fifth MOS transistor located on the load side, a sufficient operating margin can be secured even if the power voltage is lowered.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
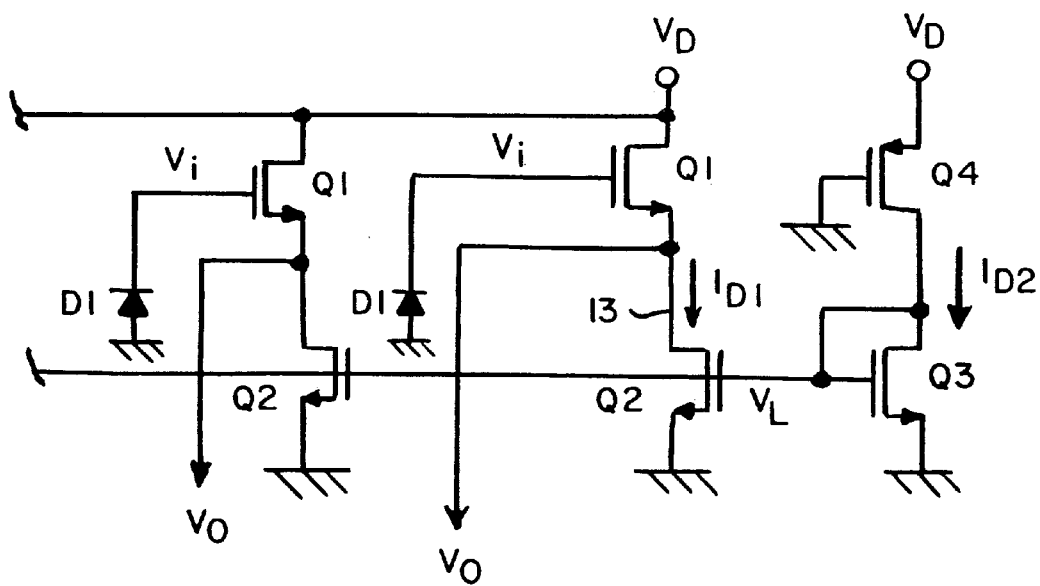
FIG. 1 is a circuit diagram of an amplification type solid state imaging device output circuit according to a first embodiment of the present invention.

Amplification type solid state imaging device output circuits of the present invention will be described in detail below on the basis of embodiments shown in the drawings.

First Embodiment

Figure 6:
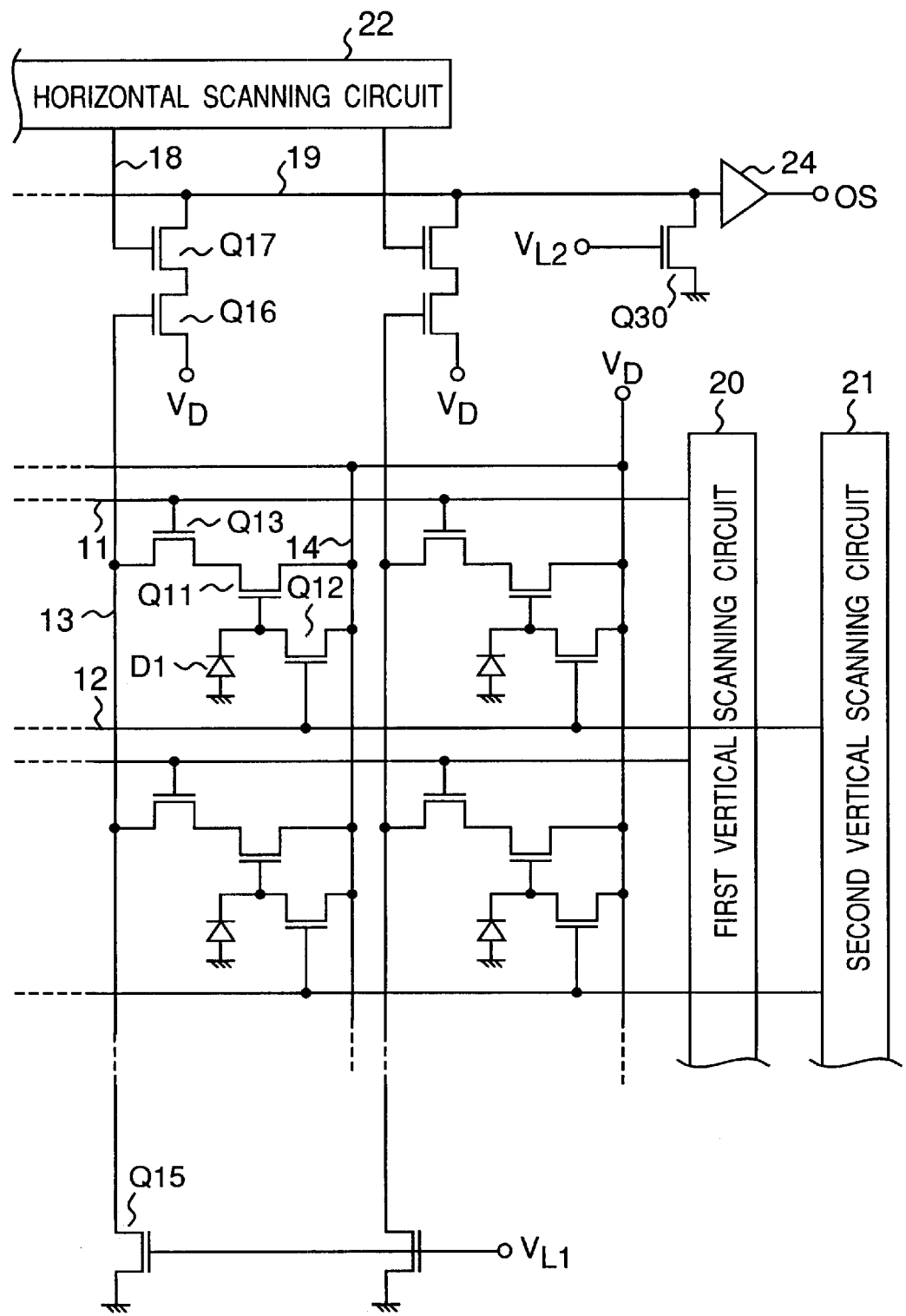
FIG. 6 is a circuit diagram of a conventional amplification type solid state imaging device output circuit.
Figure 7:
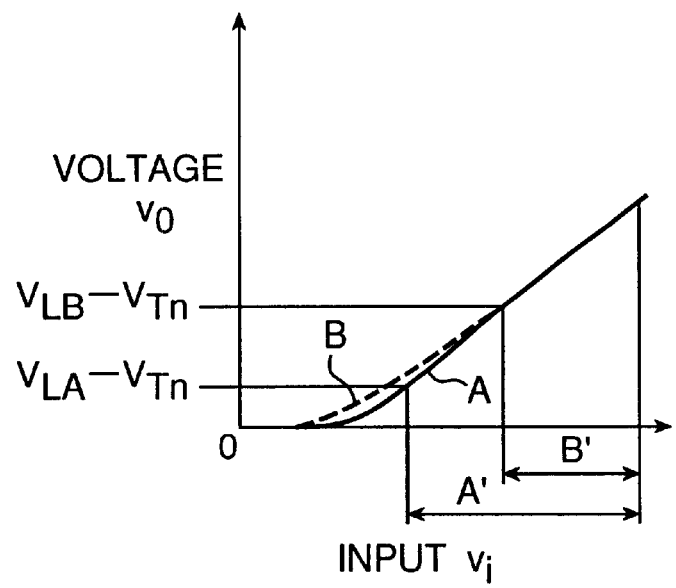
FIG. 7 is a graph showing characteristics of a source follower circuit of the above amplification type solid state imaging device output circuit.
Figure 8:
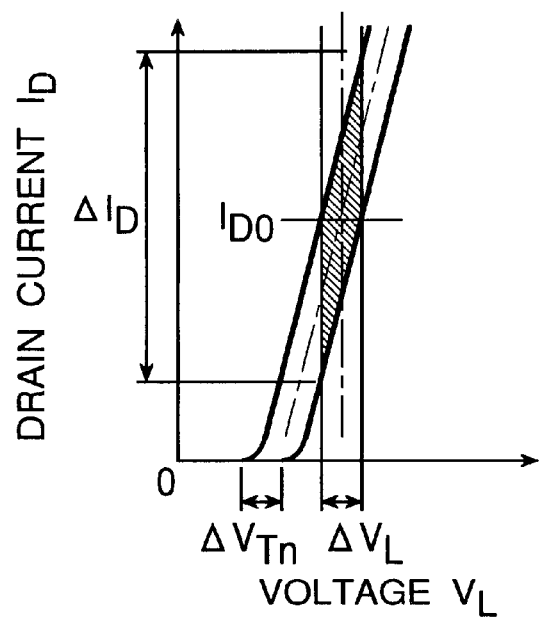
FIG. 8 is a graph for explaining a disadvantage of the above source follower circuit.
Figure 9:
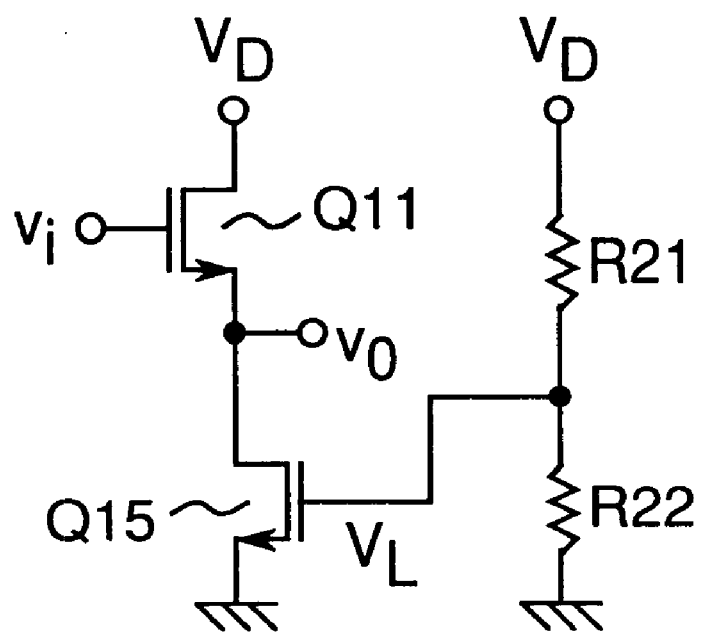
FIG. 9 is a circuit diagram of the above source follower circuit.
Figure 10:
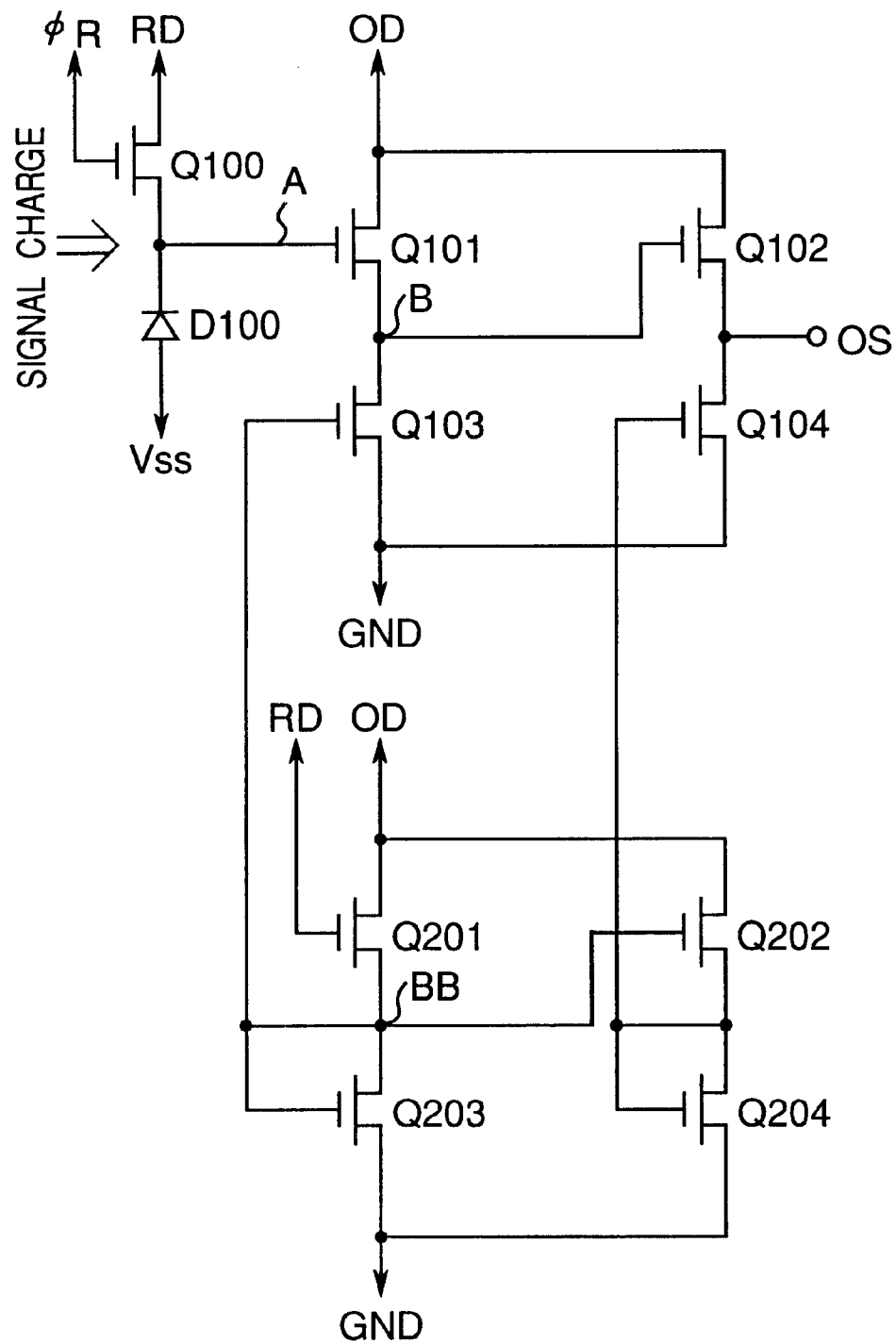
FIG. 10 is a circuit diagram of another conventional amplification type solid state imaging device output circuit.
Figure 11:
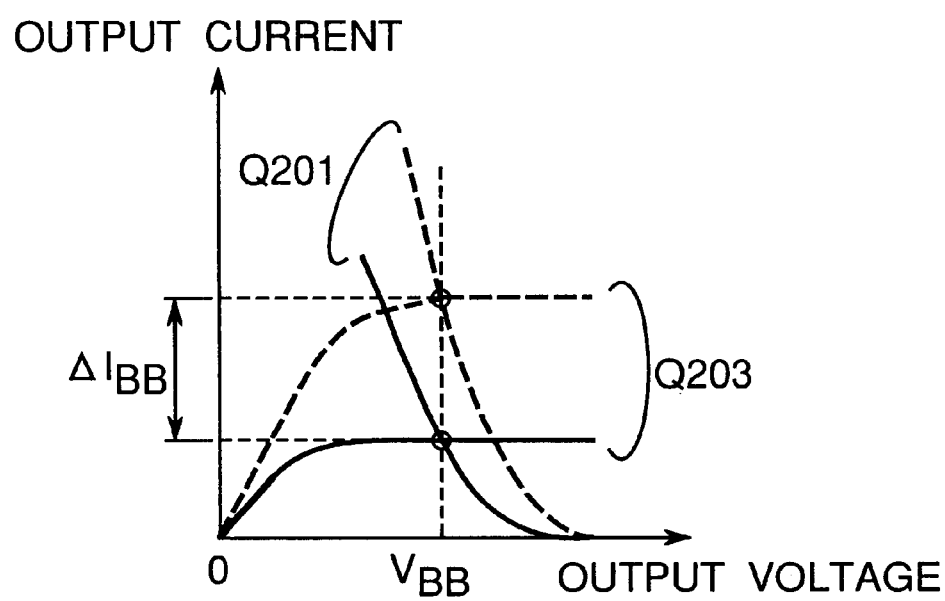
FIG. 11 is a graph for explaining a disadvantage of the above source follower circuit.

FIG. 1 shows a circuit diagram of an amplification type solid state imaging device output circuit of the first embodiment of the present invention. Referring to FIG. 1, a power source $V_D$ is connected to a drain of a first MOS transistor Q1 to a gate of which is inputted an input $v_i$, that is, a photoelectric conversion signal from a photodiode that serves as a photoelectric conversion element (not shown). A drain of a second MOS transistor Q2 that serves as a constant current load is connected via a vertical signal line 13 to a source of the first MOS transistor Q1, while a source of the second MOS transistor Q2 is grounded. The first and second MOS transistors Q1 and Q2 constitute a first source follower circuit. A gate and a drain of a third MOS transistor Q3 are connected to the gate of the second MOS transistor Q2, while the source of the third MOS transistor Q3 is grounded. The second and third MOS transistors Q2 and Q3 have an identical channel structure to constitute a current mirror circuit. Each of the first through third MOS transistors Q1 through Q3 is the n-channel type. A drain of a p-channel type MOS transistor Q4 that serves as a first load is connected to the drain of the third MOS transistor Q3, while a source of the MOS transistor Q4 is connected to a power source $V_D$ and a gate of the MOS transistor Q4 is grounded. The first and second MOS transistors Q1 and Q2 correspond to the MOS transistors Q11 and Q15, respectively, shown in FIG. 6.

In the amplification type solid state imaging device output circuit having the aforementioned construction, a voltage $V_L$ is applied to the gate of the second MOS transistor Q2 by the third MOS transistor Q3 and the MOS transistor Q4. The MOS transistor Q4 has a gate-to-source voltage equal to the power voltage $V_D$. Using the drain voltage $V_L$ as a parameter, the drain current $I_D$ changes as indicated by "A" in FIG. 2. In this case, assuming that a threshold voltage of the MOS transistor Q4 is $V_{TP}$, since a gate voltage $V_G$ and a drain-to-source voltage $V_{DS}$ of the MOS transistor Q4 are:

$$V_G - V_T = V_D - V_{TP},$$

and $$V_{DS} = V_D - V_L,$$

then the MOS transistor Q4 has a linear region in the greater part of a period during which:

$$V_{DS} < V_G - V_T$$

i.e., $$V_L > V_{TP}.$$

That is, a drain current $I_{D2}$ flowing through the MOS transistor Q4 is expressed by:

$$I_{D2} = (\mu CW/L)(V_G - V_T)V_{DS} \quad (5)$$

according to a relational expression in the linear region.

Figure 2:
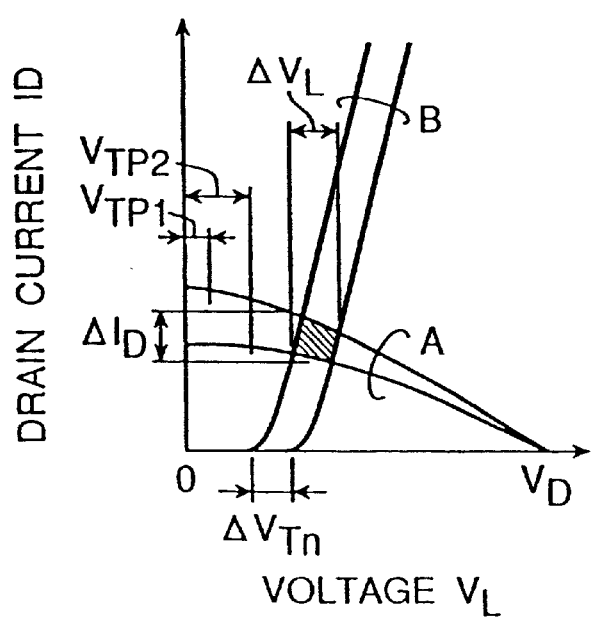
FIG. 2 is a graph for explaining the operation of the amplification type solid state imaging device output circuit according to the first embodiment.

However, the power voltage $V_D$ is sufficiently greater than variation in the threshold voltage $V_{TP}$ ($V_{TP1}$ and $V_{TP2}$ of FIG. 2) of the MOS transistor Q4, and therefore, the quantity of change $V_G - V_T = V_D - V_{TP}$ is small in the MOS transistor Q4, and the quantity of change in the drain current $I_{D2}$ indicated by "A" in FIG. 2 is also small.

On the other hand, the gate and drain of the third MOS transistor Q3 have an identical voltage $V_L$, and therefore, the drain current $I_D$ changes as indicated by "B" in FIG. 2 in accordance with variation in the threshold voltage $V_{Tn}$ of the third MOS transistor Q3. An identical current $I_{D2}$ flows through the third MOS transistor Q3 and the MOS transistor Q4, and therefore, change of the drain current $I_{D2}$ takes place within a hatched region of FIG. 2, and variation of the drain current $I_{D2}$ becomes $\Delta I_D$.

In this case, the third MOS transistor Q3 and the second MOS transistor Q2 constitute a current mirror circuit. Furthermore, the third MOS transistor Q3 and the second MOS transistor Q2 have the same channel structure, and therefore, both the transistors Q2,Q3 have a close correlation on an identical chip with regard to the change in the threshold voltage $V_{Tn}$. Therefore, a drain current $I_{D1}$ that flows through the second MOS transistor Q2 changes roughly in proportion to the drain current $I_{D2}$ that flows through the third MOS transistor Q3. That is, change in the drain current $I_{D1}$ also takes place within the hatched region $\Delta I_D$ of FIG. 2, meaning that the variation of the drain current $I_{D1}$ is suppressed to a reduced value.

An output voltage $v_o$ of the second MOS transistor Q2 and the first MOS transistor Q1 becomes linear within the range:

$$V_L - V_{Tn} < V_0 < V_D - \sqrt{\frac{2I_{D1}}{\mu C o W_D / L_D}} \quad (6)$$

and assuming that:

$$V_L - V_{Tn} < 1V \quad (7)$$

with regard to the second MOS transistor Q2, then a sufficient operating range can be secured even if the power voltage $V_D$ is low. In the inequality (6), $\mu$, Co, $W_D$ and $L_D$ represent the mobility, gate capacitance per unit area, channel width and channel length, respectively, of the MOS transistor.

As described above, in the first source follower circuit that amplifies the photoelectric conversion signal from the photodiode (not shown) and drives the vertical signal line 13, the variation in the current $I_{D1}$ that flows through the second MOS transistor Q2 located on the load side is small. Therefore, even if the potential difference $V_L - V_{Tn}$ between the gate voltage $V_L$ and the threshold voltage $V_{Tn}$ of the second MOS transistor Q2 located on the load side is made to be reduced in order to widen the operating margin of this first source follower circuit, the ability of the first source follower circuit to drive the vertical signal line 13 scarcely changes. Accordingly, a sufficient operating margin can be secured and fluctuations in consumption of current can be suppressed with respect to fluctuations in the threshold voltage and the power voltage, with a simple construction. By reducing the voltage difference $V_L - V_{Tn}$ between the gate voltage $V_L$ and the threshold voltage $V_{Tn}$ of the second MOS transistor Q2 located on the load side, a sufficient operating margin can be secured even if the power voltage $V_D$ is lowered.

The first load of the third MOS transistor Q3, i.e., the load of the current mirror circuit is provided by the MOS transistor Q4 which has the conductive type opposite to the conductive type of the third MOS transistor Q3 and in which the potential difference between the source and the gate is used as a power voltage. Thereby, the power voltage $V_D$ becomes sufficiently greater than the variation in the threshold voltage $V_{TP}$ of the MOS transistor Q4. Therefore, the quantity of change in the potential difference $V_L - V_{TP}$ between the gate voltage $V_L$ and the threshold voltage $V_{TP}$ of the MOS transistor Q4 is reduced, and the quantity of change in the current flowing through the third MOS transistor Q3 of the current mirror circuit is also reduced. Therefore, the quantity of change in the current that flows through the second MOS transistor Q2 located on the load side of the first source follower circuit is reduced, allowing the operating margin of the first source follower circuit for driving the vertical signal line 13 to be wider.

The operating margin is widened by setting to 1 V or less the voltage difference $V_L - V_{Tn}$ between the gate voltage $V_L$ and the threshold voltage $V_{Tn}$ of the second MOS transistor Q2 located on the load side, by which a sufficient operating margin can be secured even if the power voltage $V_D$ is lowered, allowing a low-voltage operation to be achieved.

Second Embodiment

Figure 3:
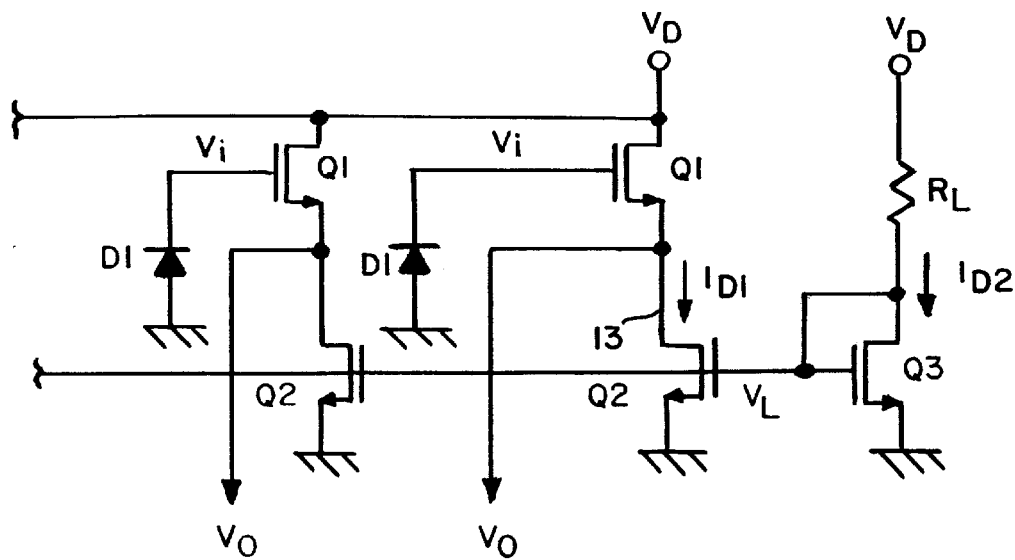
FIG. 3 is a circuit diagram of an amplification type solid state imaging device output circuit according to a second embodiment of the present invention.

FIG. 3 shows a circuit diagram of an amplification type solid state imaging device output circuit of the second embodiment of the present invention. This amplification type solid state imaging device output circuit has the same construction as that of the amplification type solid state imaging device output circuit of the first embodiment shown in FIG. 1 except for a fixed resistor $R_L$, and the same components as those in FIG. 1 will be denoted by the same reference numerals with no description provided for them.

Figure 4:
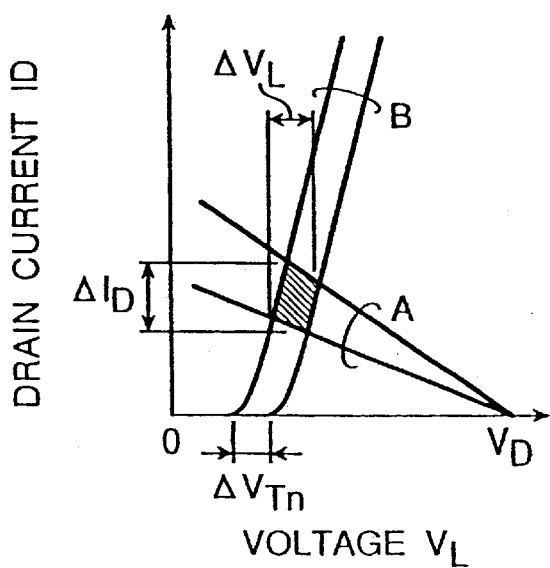
FIG. 4 is a graph for explaining the operation of the above amplification type solid state imaging device output circuit according to the second embodiment.

Referring to 3, the fixed resistor $R_L$ is inserted between a power voltage $V_D$ and a drain of a n-channel type third MOS transistor Q3 having the same channel structure as that of a second MOS transistor Q2, and a gate and a drain of the third MOS transistor Q3 are connected together. Regarding an output voltage $V_L$ as a parameter, a drain current $I_{D12}$ that flows through the fixed resistor $R_L$ changes as indicated by "A" in FIG. 4 in accordance with variation in the resistance value of the fixed resistor $R_L$. The gate and the drain of the third MOS transistor Q3 have an identical voltage $V_L$, and therefore, a drain current $I_{D11}$ changes as indicated by "B" in FIG. 4 in accordance with variation in the threshold voltage $V_{Tn}$ of the third MOS transistor Q3. The identical drain current $I_{D12}$ flows through the third MOS transistor Q3 and the fixed resistor $R_L$, and therefore, the drain current $I_{D12}$ takes place in a hatched region of FIG. 4, and variation in the drain current $I_{D12}$ becomes $\Delta I_D$.

In this case, similarly to the case of the first embodiment of FIG. 2, the third MOS transistor Q3 and the second MOS transistor Q2 constitute a current mirror circuit. Furthermore, the third MOS transistor Q3 and the second MOS transistor Q2 have the same channel structure, and therefore, both the transistors have a close correlation on an identical chip with regard to the change in the threshold voltage $V_{Tn}$. Therefore, the drain current $I_{D11}$ that flows through the second MOS transistor Q2 is roughly proportional to the drain current $I_{D12}$ that flows through the third MOS transistor Q3. That is, the change in the drain current $I_{D11}$ also tales place in the hatched region $\Delta I_D$ of FIG. 4, meaning that the variation is suppressed to a reduced value. If the relations of the inequality (6) and the inequality (7) are applied to the second MOS transistor Q2 similarly to the first embodiment, then a sufficient operating range is secured even if the power voltage $V_D$ is low.

As described above, in the first source follower circuit that amplifies the photoelectric conversion signal from the photodiode (not shown) and drives the vertical signal line 13, the variation in the current $I_{D11}$ that flows through the second MOS transistor Q2 located on the load side is small. Therefore, even if the potential difference $V_L-V_{Tn}$ between the gate voltage $V_L$ and the threshold voltage $V_{Tn}$ of the second MOS transistor Q2 located on the load side is reduced in order to widen the operating margin of this first source follower circuit, then the ability of the first source follower circuit to drive the vertical signal line 13 scarcely changes. Therefore, a sufficient operating margin can be secured and the fluctuations in consumption of current can be suppressed with respect to the fluctuations in the threshold voltage and the power voltage, with a simple construction. Furthermore, by reducing the voltage difference $V_L-V_{Tn}$ between the gate voltage $V_L$ and the threshold voltage $V_{Tn}$ of the second MOS transistor Q2 located on the load side, a sufficient operating margin can be secured even if the power voltage $V_D$ is lowered.

By providing the first load of the third MOS transistor Q3, i.e., the load of the current mirror circuit by the fixed resistor $R_L$, the quantity of change in the current $I_{D12}$ that flows through the third MOS transistor Q3 of the current mirror circuit in accordance with the variation in the resistance value of the fixed resistor $R_L$ is reduced. Therefore, the quantity of change in the current $I_{D11}$ that flows through the second MOS transistor Q2 located on the load side of the first source follower circuit for driving the vertical signal line 13 is also reduced, allowing the operating margin to be widened with a simple construction.

The operating margin is widened by setting to 1 V or less the voltage difference $V_L-V_{Tn}$ between the gate voltage $V_L$ and the threshold voltage $V_{Tn}$ of the second MOS transistor Q2 located on the load side. Therefore, a sufficient operating margin can be secured even if the power voltage $V_D$ is lowered, allowing a low-voltage operation to be achieved.

Third Embodiment

Figure 5:
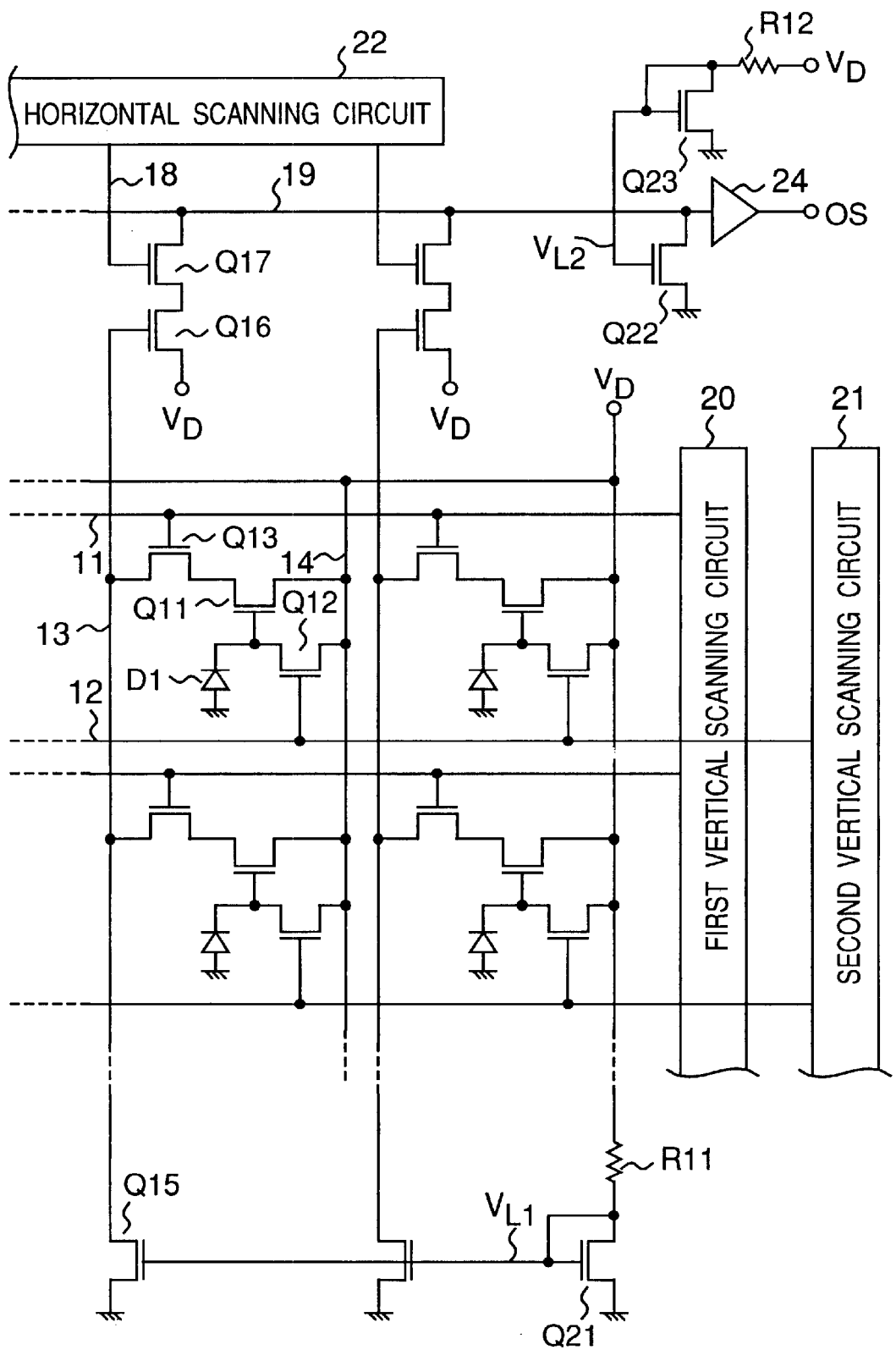
FIG. 5 is a circuit diagram of an amplification type solid state imaging device employing an amplification type solid state imaging device output circuit according to a third embodiment of the present invention.

FIG. 5 shows a circuit diagram of essential parts of an amplification type solid state imaging device employing the amplification type solid state imaging device output circuit of the second embodiment shown in FIG. 3. Referring to FIG. 5, a plurality of pixels that are each constructed of a photodiode D1 that serves as a photoelectric conversion element, a MOS transistor Q11 that serves as an amplifying section, a MOS transistor Q12 that serves as a reset section and a MOS transistor Q13 that serves as a pixel selecting section are arranged in a matrix form. A first vertical scanning circuit 20 is connected via a pixel selecting clock line 11 to a gate of the MOS transistor Q13 of each pixel. A second vertical scanning circuit 21 is connected via a reset clock line 12 to the gate of the MOS transistor Q12 of each pixel, while a source of the first MOS transistor Q11 is connected to a vertical signal line 13 via the MOS transistor Q13. A power line 14 is connected to a drain of the first MOS transistor Q11 of each pixel. A second MOS transistor Q15 used as a load is connected across the vertical signal line 13 and the ground, by which the first and second MOS transistors Q11 and Q15 constitute a first source follower circuit. A gate of a third MOS transistor Q21 is connected to a gate of the second MOS transistor Q15, while the third MOS transistor Q21 has a gate and a drain connected together and a source of the third MOS transistor Q21 is grounded. The second and third MOS transistors Q15 and Q21 constitute a current mirror circuit. The third MOS transistor Q21 is an n-channel type transistor having the same channel structure as that of the second MOS transistor Q15. A fixed resistor R11 that serves as a load is connected across the drain of the third MOS transistor Q21 and a power source $V_D$.

The gate of a fourth MOS transistor Q16 is connected to the vertical signal line 13. The power source $V_D$ is connected to a drain of the fourth MOS transistor Q16, and a horizontal signal line 19 that serves as a common signal line is connected via a MOS transistor Q17 to the source of the fourth MOS transistor Q16. A horizontal scanning circuit 22 is connected to the gate of the MOS transistor Q17 via a vertical scanning line 18. A drain of a fifth MOS transistor Q22 used as a load is connected to the horizontal signal line 19, while a source of the fifth MOS transistor Q22 is grounded. The fourth and fifth MOS transistors Q16 and Q22 constitute a second source follower circuit. A gate of a sixth MOS transistor Q23 is connected to a gate of the fifth MOS transistor Q22, while the gate and the drain of the sixth MOS transistor Q23 are connected together. A source of the sixth MOS transistor Q23 is grounded. The fifth and sixth MOS transistors Q22 and Q23 constitute a current mirror circuit. A fixed resistor R12 that serves as a second load is connected between the drain of the sixth MOS transistor Q23 and a power source $V_D$. An input terminal of an amplifier circuit 24 is connected to the horizontal signal line 19.

In the amplification type solid state imaging device having the aforementioned construction, a voltage $V_{L1}$ determined by the fixed resistor R11 is outputted to the connection point of the gate of the second MOS transistor Q15 and the gate of the third MOS transistor Q21. By applying this voltage $V_{L1}$ to the gate of the second MOS transistor Q15, a roughly constant current flows through the second MOS transistor Q15 even if a threshold voltage of the second MOS transistor Q15 varies for the reasons described with reference to FIG. 3 and FIG. 4 of the second embodiment.

Likewise, a voltage $V_{L2}$ determined by the fixed resistor R12 is outputted to the connection point of the gate of the fifth MOS transistor Q22 and the sixth MOS transistor Q23. By applying this voltage $V_{L2}$ to the gate of the fifth MOS transistor Q22, a roughly constant current flows through the fifth MOS transistor Q22 even if a threshold voltage of the fifth MOS transistor Q22 varies for the reasons described with reference to FIG. 3 and FIG. 4 of the second embodiment.

As described above, the aforementioned amplification type solid state imaging device output circuit has an operation and an effect similar to those of the amplification type solid state imaging device output circuit of the second embodiment shown in FIG. 3. Furthermore, similarly to the first source follower circuit, the variation in the current that flows through the fifth MOS transistor Q22 located on the load side is small in the second source follower circuit (fourth and fifth MOS transistors Q16 and Q22) that amplifies the signal of the vertical signal line 13 and drives the common signal line 19. Therefore, even if the voltage difference between the gate voltage and the threshold voltage of the fifth MOS transistor Q22 located on the load side is reduced in order to widen the operating margin of this second source follower circuit, the ability of the second source follower circuit to drive the horizontal signal line 19 scarcely changes. By reducing the voltage difference between the gate voltage and the threshold voltage of the fifth MOS transistor Q22 located on the load side, a sufficient operating margin can be secured even if the power voltage is lowered. Accordingly, there can be provided an amplification type solid state imaging device capable of securing a sufficient operating margin and suppressing fluctuations in consumption of current with respect to the fluctuations in the threshold voltage and the power voltage and stably operating at a low voltage, with a simple construction.

By providing the second load of the sixth MOS transistor Q23, i.e., the load of the current mirror circuit by the fixed resistor R12, the quantity of change in the current that flows through the sixth MOS transistor Q23 of the current mirror circuit due to the variation of the fixed resistor R12 is small. Therefore, the quantity of change in the current that flows through the fifth MOS transistor Q22 located on the load side of the second source follower circuit for driving the horizontal signal line 19 is reduced, allowing the operating margin to be widened with a simple construction.

By setting to 1 V or less the voltage difference between the gate voltage and the threshold voltage of the fifth MOS transistor Q22 located on the load side, the operating margin is widened. Therefore, a sufficient operating margin can be secured even if the power voltage is lowered, allowing a low-voltage operation to be achieved.

Although the third embodiment has been described on the basis of the amplification type solid state imaging device employing the amplification type solid state imaging device output circuit of the second embodiment shown in FIG. 3, it is acceptable to apply the amplification type solid state imaging device output circuit of the first embodiment shown in FIG. 1 to an amplification type solid state imaging device.

The aforementioned first through third embodiments have been described on the basis of the amplification type solid state imaging device output circuit employing the n-channel type for each of the first through sixth MOS transistors Q1, Q2, Q3, Q11, Q15, Q16, Q21, Q22 and Q23. However, the amplification type solid state imaging device output circuit may employ the p-channel type for each of the first through sixth MOS transistors, and in this case, operations and effects similar to those of the first through third embodiments are obtained.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. An amplifying solid state imaging device output circuit provided with a plurality of pixels, each pixel having a first source follower circuit comprised of a first MOS transistor that is formed on a semiconductor substrate and amplifies a photoelectric conversion signal from a photoelectric conversion element and a second MOS transistor used as a load that is formed on the semiconductor substrate and is connected to the first MOS transistor via a signal line, comprising:

a third MOS transistor that is formed on the semiconductor substrate with a channel structure identical to that of a plurality of the second MOS transistors and has a gate and a drain connected to a plurality of gates of the second MOS transistors so as to form a current mirror circuit with the second MOS transistor; and a first load that is formed on the semiconductor substrate and provided for flowing a roughly constant current through the third MOS transistor.

2. An amplifying solid state imaging device output circuit as set forth in claim 1, wherein the first load is a MOS transistor of an opposite conductive type to a conductive type of the third MOS transistor, and a potential difference between the source and the gate of the MOS transistor is used as a power voltage.

3. An amplifying solid state imaging device output circuit as set forth in claim 1, wherein the first load is a fixed resistor.

4. An amplifying solid state imaging device output circuit provided with a first source follower circuit comprised of a first MOS transistor that is formed on a semiconductor substrate and amplifies a photoelectric conversion signal from a photoelectric conversion element and a second MOS transistor used as a load that is formed on the semiconductor substrate and is connected to the first MOS transistor via a signal line, comprising:

a third MOS transistor that is formed on the semiconductor substrate with a channel structure identical to that of the second MOS transistor and has a gate and a drain connected to a gate of the second MOS transistor so as to form a current mirror circuit with the second MOS transistor;

a first load that is formed on the semiconductor substrate and provided for flowing a roughly constant current through the third MOS transistor; and wherein the first load is selected so that a potential difference between a gate voltage and a threshold voltage of the second MOS transistor is set to 1 V or less.

5. An amplifying solid state imaging device output circuit provided with a first source follower circuit comprised of a first MOS transistor that is formed on a semiconductor substrate and amplifies a photoelectric conversion signal from a photoelectric conversion element and a second MOS transistor used as a load that is formed on the semiconductor substrate and is connected to the first MOS transistor via a signal line, comprising:

a fourth MOS transistor that is formed on the semiconductor substrate and amplifies a signal on the signal line;

a fifth MOS transistor used as a second load that is formed on the semiconductor substrate and is connected to the fourth MOS transistor via a common signal line so as to form a second source follower circuit with the fourth MOS transistor;

a sixth MOS transistor that is formed on the semiconductor substrate with a channel structure identical to that of the fifth MOS transistor and has a gate and a drain connected to a gate of the fifth MOS transistor so as to form a current mirror circuit with the fifth MOS transistor; and a second load that is formed on the semiconductor substrate and provided for flowing a roughly constant current through the fifth MOS transistor.

6. An amplifying solid state imaging device output circuit as set forth in claim 5, wherein the second load is a MOS transistor of an opposite conductive type to a conductive type of the sixth MOS transistor, and a potential difference between the source and the gate of the MOS transistor is used as a power voltage.

7. An amplifying solid state imaging device output circuit as set forth in claim 5, wherein the second load is a fixed resistor.

8. An amplifying solid state imaging device output circuit as set forth in claim 5, wherein a potential difference between a gate voltage and a threshold voltage of the fifth MOS transistor is set to 1 V or less.

* * * * *